(12) United States Patent
Schmidt et al.

(10) Patent No.: US 9,069,568 B2
(45) Date of Patent: Jun. 30, 2015

(54) COMPILATION DEPENDENCY RESOLUTION FROM A DIVERSE GROUP OF CANDIDATE RESOURCES

(71) Applicant: International Business Machines Corporation, Armonk, NY (US)

(72) Inventors: David L. Schmidt, Cary, NC (US); Scott A. Will, Wake Forest, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 90 days.

(21) Appl. No.: 13/720,269

(22) Filed: Dec. 19, 2012

(65) Prior Publication Data

US 2014/0173574 A1    Jun. 19, 2014

(51) Int. Cl.
G06F 9/45    (2006.01)
G06F 9/44    (2006.01)

(52) U.S. Cl.
CPC ........ G06F 8/43 (2013.01); G06F 8/427 (2013.01); G06F 8/70 (2013.01)

(58) Field of Classification Search
USPC .............. 717/125, 131, 140, 151, 166–177; 707/758; 714/27; 703/14
IPC .......................................................... G06F 8/43
See application file for complete search history.

(56) References Cited

U.S. PATENT DOCUMENTS

| | | | |
|---|---|---|---|
| 7,127,707 B1 * | 10/2006 | Mishra et al. | 717/137 |
| 7,283,991 B1 * | 10/2007 | Kimmerly | 717/166 |
| 7,503,034 B2 | 3/2009 | Berg et al. | |
| 7,509,633 B2 | 3/2009 | Nesbitt et al. | |
| 7,647,336 B2 | 1/2010 | Branda et al. | |
| 7,945,902 B1 * | 5/2011 | Sahoo | 717/131 |
| 8,196,129 B2 | 6/2012 | Martin et al. | |
| 2003/0159135 A1 * | 8/2003 | Hiller et al. | 717/166 |
| 2003/0200350 A1 | 10/2003 | Kumar et al. | |
| 2004/0255293 A1 * | 12/2004 | Spotswood | 717/176 |
| 2005/0210462 A1 * | 9/2005 | Chupa et al. | 717/171 |

(Continued)

OTHER PUBLICATIONS

Tobias Rickli, A component model for the .NET CLR, Masters Thesis, Sep. 21, 2010, pp. 1-37, Department of Computer Science, Swiss Federal Institute of Technology Zurich, Published online at: http://systems.ethz.pubzone.org/servlet/Attachment?attachmentId=379&versionId=1534932.

(Continued)

*Primary Examiner* — Tuan Vu
(74) *Attorney, Agent, or Firm* — Lee Law, PLLC; Christopher B. Lee

(57) ABSTRACT

A determination is made that at least one missing dependency reference of a portion of a software code build prevents full dependency resolution of the software code build. Search path processing is invoked using a SEARCHPATH definition to locate all additional accessible code modules that are potential candidate code modules to resolve the at least one missing dependency reference. The SEARCHPATH definition includes a set of predefined alternative search locations relative to dependency locations specified for the software code build. An interface definition of each coded method is identified within each located additional accessible code module found by the search path processing. A code module found by the search path processing that includes an identified interface definition of at least one coded method that resolves at least a portion of interface requirements of the at least one missing dependency reference is selected.

20 Claims, 4 Drawing Sheets

(56) References Cited

U.S. PATENT DOCUMENTS

| | | | |
|---|---|---|---|
| 2005/0278278 A1 | 12/2005 | Petev et al. | |
| 2006/0136401 A1* | 6/2006 | Normington | 707/3 |
| 2007/0061792 A1* | 3/2007 | Atsatt | 717/151 |
| 2008/0022268 A1 | 1/2008 | Wagner et al. | |
| 2008/0222624 A1 | 9/2008 | Mausolf et al. | |
| 2009/0178035 A1* | 7/2009 | Alpern et al. | 717/177 |
| 2011/0088011 A1* | 4/2011 | Ouali | 717/105 |
| 2011/0321019 A1* | 12/2011 | Gibbons et al. | 717/140 |
| 2012/0222023 A1* | 8/2012 | Petrovick et al. | 717/166 |
| 2012/0233591 A1 | 9/2012 | Thyagarajan et al. | |
| 2013/0311496 A1* | 11/2013 | Fedorenko et al. | 707/758 |

OTHER PUBLICATIONS

John Corwin, et al., MJ: A Rational Module System for Java and its Applications, Proceedings of the 18th Annual ACM SIGPLAN Conference on Object-Oriented Programming, Systems, Languages, and Applications (OOPSLA '03), Oct. 26-30 2003, pp. 241-254, Association for Computing Machinery (ACM), Published online at: http://researcher.watson.ibm.com/researcher/files/us-bacon/Corwin03MJ.pdf.

R. Campbell, et al., How can I resolve the conflict between loose coupling/dependency injection and a rich domain model?, Webpage/site, Apr. 2009, pp. 1-5, StackOverflow.com, Published online at: http://stackoverflow.com/questions/694374/how-can-i-resolve-the-conflict-between-loose-coupling-dependency-injection-and-a.

Author Unknown, Java Classloader: JAR hell, Webpage/site, Dec. 16, 2012, pp. 1-4, Wikimedia Foundation, Inc., Published online at: http://en.wikipedia.org/wiki/JAR_hell#JAR_hell.

Author Unknown, Understanding Extension Class Loading, Webpage/site, 1995, pp. 1-2, Oracle Corporation, Published online at: http://download.oracle.com/javase/tutorial/ext/basics/load.html.

Alex Buckley, et al., JSR 277: Java(TM) Module System, Webpage/site, 2012, pp. 1-9, Oracle Corporation, Published online at: http://www.jcp.org/en/jsr/detail?id=277.

* cited by examiner

COMPILATION DEPENDENCY RESOLUTION FROM A DIVERSE GROUP OF CANDIDATE RESOURCES

BACKGROUND

The present invention relates to compilation and static analysis of a computer program. More particularly, the present invention relates to compilation dependency resolution from a diverse group of candidate resources.

Programs may be written in a variety of programming languages. Partitioning of code constructs into modules or components facilitates compartmentalization and reuse of the partitioned code constructs. The partitioned code constructs may be compiled individually or collectively, and may be linked together to form a program. Programs also may be compiled into executable code targeted to a particular platform or may be compiled/translated into intermediate portable machine code (p code) that may be interpreted at runtime and executed upon a given platform.

BRIEF SUMMARY

A method includes determining, via a processor, that at least one missing dependency reference of a portion of a software code build prevents full dependency resolution of the software code build; invoking search path processing using a SEARCHPATH definition to locate all additional accessible code modules that are potential candidate code modules to resolve the at least one missing dependency reference, where the SEARCHPATH definition comprises a set of predefined alternative search locations relative to dependency locations specified for the software code build; identifying an interface definition of each coded method within each located additional accessible code module found by the search path processing that is a potential candidate code module to resolve the at least one missing dependency reference; and selecting a code module found by the search path processing that comprises an identified interface definition of at least one coded method that resolves at least a portion of interface requirements of the at least one missing dependency reference.

A system includes at least one memory that stores a software code build; and a processor programmed to: determine that at least one missing dependency reference of a portion of the software code build prevents full dependency resolution of the software code build; invoke search path processing using a SEARCHPATH definition to locate all additional accessible code modules that are potential candidate code modules to resolve the at least one missing dependency reference, where the SEARCHPATH definition includes a set of predefined alternative search locations relative to dependency locations specified for the software code build; identify an interface definition of each coded method within each located additional accessible code module found by the search path processing that is a potential candidate code module to resolve the at least one missing dependency reference; and select a code module found by the search path processing that includes an identified interface definition of at least one coded method that resolves at least a portion of interface requirements of the at least one missing dependency reference.

A computer program product includes: a computer readable storage medium having computer readable program code embodied therewith, where the computer readable program code when executed on a computer causes the computer to: determine that at least one missing dependency reference of a portion of a software code build prevents full dependency resolution of the software code build; invoke search path processing using a SEARCHPATH definition to locate all additional accessible code modules that are potential candidate code modules to resolve the at least one missing dependency reference, where the SEARCHPATH definition includes a set of predefined alternative search locations relative to dependency locations specified for the software code build; identify an interface definition of each coded method within each located additional accessible code module found by the search path processing that is a potential candidate code module to resolve the at least one missing dependency reference; and select a code module found by the search path processing that includes an identified interface definition of at least one coded method that resolves at least a portion of interface requirements of the at least one missing dependency reference.

DETAILED DESCRIPTION

Figure 1:
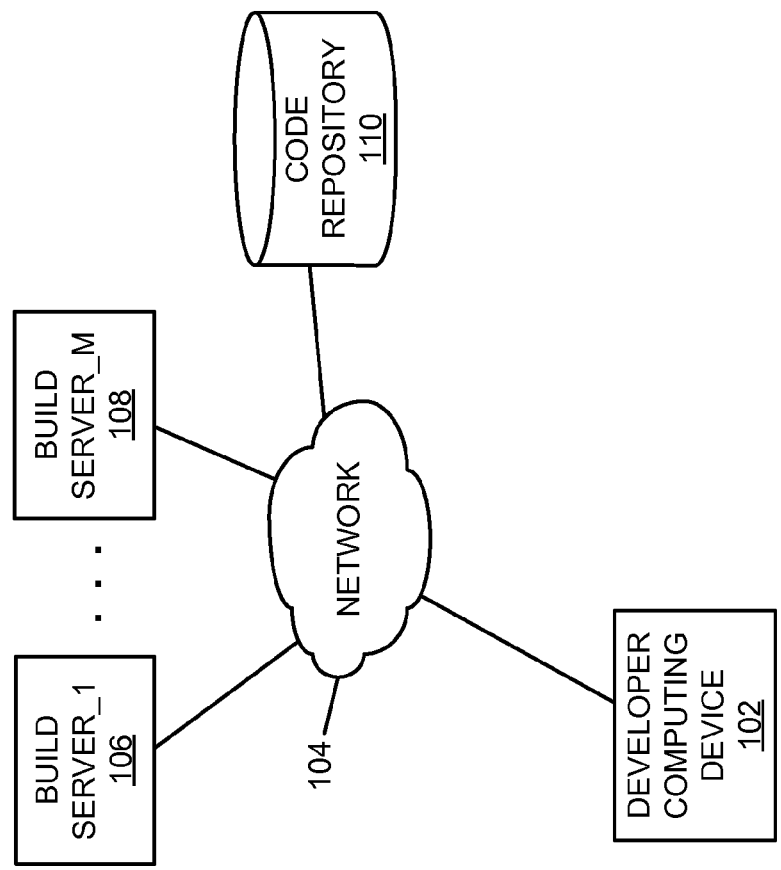
FIG. 1 is a block diagram of an example of an implementation of a system for compilation dependency resolution from a diverse group of candidate resources according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides compilation dependency resolution from a diverse group of candidate resources. The present technology operates to invoke search path processing in response to determining that at least one missing dependency reference for a portion of a software code build prevents full dependency resolution of the software code build. The search path processing uses a SEARCHPATH definition to locate all additional accessible code modules that are potential candidate code modules to resolve the missing dependency reference(s). The SEARCHPATH definition is created to include a set of predefined alternative search locations relative to dependency locations specified for the software code build. As such, the present technology exhaustively searches for additional accessible code modules to resolve the missing dependency references. An interface definition (e.g., method signature) is identified for each coded method within each located additional code module found by the search path processing that is a potential candidate to resolve the missing dependency reference(s). A suitability index is generated for each code module that provides a match for at least one missing dependency. A suitability map of all suitability indexes is generated, and a code module is selected and promoted for dependency resolution. Compilation/build processing or static code build dependency analysis may continue using the selected code module. A selected single identified module or a best-match module (in the event of collisions of multiple potential candidates) based upon the suitability indexes may be selected. The search path processing may be documented by generation of a report to provide dependency-resolution feedback.

For purposes of the present description, an "interface," "interface definition," or an "interface requirement" may include any sort of interface specification (e.g., public, private, protected, or any other construct) that is available for candidacy to resolve a missing dependency, subject to the appropriate semantic rules for the particular language within which the present technology is implemented. As such, the terms interface definition and interface requirement are used to represent an interface specification for a code module (e.g., a method/function) that may be used to invoke processing by the respective code module. For example, an interface for a method or function may include a parameter set/list of parameters, parameter names for each parameter associated with the code module interface, and/or a data type associated with each parameter, etc. The interface definition may alternatively be referred to as a "method signature." Further, the term "dependency" may include a library reference, a class reference, a Java™ programming language archive (JAR) file reference, a class file reference, a module reference, a method or function reference, or any other form of coded construct reference that may be defined for use and interfacing of modules via an interface definition. As such, a "missing dependency" refers to a dependency identified for a code build that is unavailable using dependency locations specified for the software code build (e.g., via a CLASSPATH definition or other construct). Additionally, the term "SEARCHPATH" as used herein refers to a syntactic construct that defines one or more paths or locations to be searched in response to a determination that one or more missing dependency references prevents either completion of compilation or prevents completion of static code build dependency analysis. The form of a SEARCHPATH definition may be created in any manner appropriate for a given implementation (e.g., local or remote directory paths to extra module locations, uniform resource locators (URLs) that access servers or repositories/databases that manage/store extra modules, or other syntactic path specifications to extra module storage locations). As such, any form of SEARCHPATH definition may be utilized as appropriate for a given implementation.

Regarding search path processing responsive to detection of a missing dependency, a comprehensive specification of a set of file system locations is obtained. This comprehensive set of file system locations may be referred to herein as a "SEARCHPATH." The semantics of the SEARCHPATH may be implemented in any form suitable for a given implementation, such as by use of semantics used for a "CLASSPATH" or similar construct. The SEARCHPATH includes one or more paths to additional code module locations that are potential candidate locations from which to satisfy dependencies to complete a code build. The additional locations may include additional directories/folders, additional Java™ programming language archive (JAR) files, class files, object code files, or other searchable entities or locations as appropriate for a given implementation.

By invoking (e.g., calling) the respective method or function by using all parameters specified by its interface definition, the respective method or function receives all data specified by the module to perform its defined processing. As such, a method signature of a Java™ programming language module, either within a JAR file or class file, represents an interface or interface definition for that module. Similarly, a method interface or procedure interface for any other object-oriented module represents an interface for the respective module. As such, the phrase "interface" represents an access definition to a first code module by which a second code module may invoke the first code module.

At compilation/build time or during static code build dependency analysis, if all dependencies for compilation are not satisfied with primary constructs, such as CLASSPATH constructs and other designated/configured build paths, any secondary path(s)/location(s) specified by the more-comprehensive SEARCHPATH may be searched for dependencies (e.g., again JAR and class files as examples) that meet the interface criteria (e.g., method signatures) for missing supporting code constructs. This is different from a conventional CLASSPATH traversal under which searching terminates when a first matching class name is identified and where no method signature correlation is used. With the SEARCHPATH processing described herein, JARs and classes found using the defined SEARCHPATH are searched for a set of method signatures (e.g., interface parameter sets) contained within them (rather than class names), and each JAR and/or class that is found to have at least one matching method signature is ranked with other identified matches to find a maximal matching set of parameter/interface mappings. The resulting subset of path specifications that satisfy the method signatures found during the SEARCHPATH processing within one of the predefined code module locations may then be concatenated with the CLASSPATH used for the code build or static analysis processing, to allow compilation/build or static code build dependency analysis to continue with expanded resolutions to missing build elements.

Additionally, as described above, conventional CLASSPATH processing for a given dependency terminates in response to identification of a first component that resolves the missing dependency. In contrast to this form of CLASSPATH processing, the SEARCHPATH processing described herein identifies a set of paths/locations (e.g., a list of directories, JARs, classfiles, etc.) and provides for inspection of every component identified/located by the SEARCHPATH. As such, the present technology provides a discovery mechanism for complex code build/analysis domains that may provide improved component matching analysis for dependencies associated with complex code builds.

The SEARCHPATH may be specified in any manner appropriate for a given implementation. For example, explicit directory paths or filenames may be specified. Additionally or alternatively a root or other hierarchical directory path location may be specified. The SEARCHPATH may recursively iterate from the respective hierarchical directory path location or may stop at particular point, as appropriate for a given implementation. As such, many possibilities exist for specification of the SEARCHPATH and all such possibilities are considered within the scope of the present technology.

To elaborate upon the method signature identification and matching, as described above, if full compile-time resolution of all external code module dependencies is not achieved, SEARCHPATH processing may be invoked. Classes and JAR files may be introspected (e.g., using Java™ programming language reflection) to inspect code component interfaces and to find method signatures across multiple classes that match the missing external dependencies. Failing method reference dependencies from the code/build being compiled or analyzed may be compared against the method signatures identified within the SEARCHPATH classes. A number of times a resolution for any given missing dependency is found within each SEARCHPATH entity may be computed.

A suitability index may be generated for each potential matching method signature. The suitability index may include any form of measure appropriate for a given implementation of a correlation between the missing dependency and the respective identified method signature. For example, the computed number of times a resolution for any given missing dependency is found within each SEARCHPATH entity may be used as the suitability index. Additionally or alternatively, a ranking or percentage match, or a more specific suitability index that identifies partial matches by data type may be generated, as appropriate for a given situation.

As such, where multiple potential matches for a method signature are identified within the specified SEARCHPATH, each potential match may be evaluated to identify a degree of matching of parameters used within the method signature interface. To provide a more detailed example, where a SEARCHPATH returns two (or more) identified method signatures associated with different candidate dependency matches that each include parameter names for all interface elements, additional processing may be performed to generate a suitability index for each of the identified candidate dependency matches. To index the candidate matches, an evaluation of parameter data types, data field widths, and other method signature interface definitional aspects may be performed. Where one or more of the candidate matches includes an identical method signature (e.g., all parameter names, data types, and data field widths match exactly), such candidate matches may be given a one hundred percent (100%) suitability index (or other form of ranking as appropriate for a given implementation). Further, where any candidate has a mismatch of one or more data types or data field widths for respective parameter definitions/names, such candidate matches may be given a lower suitability index based upon the degree of mismatch for the respective data types or data field widths. Many other examples of suitability index generation and assignment are possible and all such possibilities are considered within the scope of the present technology.

A suitability map may be constructed with the respective dependency resolutions and generated suitability indexes correlated for the different identified candidate matches. The suitability map may be used to document and rank multiple candidate method signatures based upon the assigned suitability indexes. The suitability map may be reported as part of processing output to provide developer feedback of the information documented within the suitability map.

Any code construct(s) that resolves a dependency may be promoted to a CLASSPATH for continuation of compilation or dependency analysis. In a situation where more than one JAR or class file contains one or more similar or identical dependency resolutions (e.g., a dependency resolution collision), the code construct that resolves the most dependencies may be selected and promoted to the CLASSPATH for continuation of compilation. For individual files, the decision to promote a matching candidate to the CLASSPATH may be considered a binary decision (e.g., promote or not promote). For wrapper-type elements (e.g., JAR files), the decision on which potential candidate match to promote may be based on a most-accurately matched set of method signature interfaces.

The best match may be placed into the CLASSPATH (e.g., by concatenation) and used for further processing. For example, where a first JAR file "A" has been determined to resolve eight (8) dependencies and a second JAR file "B" has been determined to resolve ten (10) dependencies, JAR file "B" may be promoted to a CLASSPATH for further build processing or static code build dependency analysis processing to form the respective outputs, as described in more detail below.

The respective outputs may include, for example, a completed code build itself, a code build report, a static code build dependency analysis report, or other output as appropriate for a given implementation. Regarding compilation or dependency analysis output as described above, the code construct(s) found and used on the SEARCHPATH, and those promoted to a CLASSPATH, may be reported as dependency-resolution feedback to the user to notify the user of the external support selected to resolve the dependencies. Additionally, the dependency-resolution feedback provides the user with the ability to eliminate "obsolete" versions (e.g., beta versions, older versions, etc.) of JARs or class files that satisfied the suitability match but that are not intended to be used within a code build. As such, the present technology provides programmatic best-match processing for dependency resolution, and provides dependency-resolution feedback that may be used to further improve code builds over time and reduce unintended build processing and storage space consumption. Further, the present technology provides a dependency discovery approach to improve management and analysis of complex code builds over time.

It should be noted that conception of the present subject matter resulted from recognition of certain limitations associated with compilation dependency resolution in complex environments where many pre-compiled components may be selected for compilation. For example, it was observed that when writing and compiling software in a complex "ecosystem" possibly comprised of many pre-compiled software components (e.g., libraries, etc.), it may be difficult to correctly and completely specify required dependency paths to all supporting software components for a code build. It was additionally observed that in Java™ and Eclipse® environments, configuration elements (e.g., CLASSPATH) and build paths are used/required to point to all secondary supporting software components that the rest of the software under development relies upon during execution. It was further observed that there may be multiple levels or versions of the supporting software components available within a given build environment, possibly together on the same file system as the machine being used to perform the build. It was determined, in view of these observations, that the resulting problem is a hybrid between a compile-time problem (e.g., the source code that is being compiled) and a run-time problem (e.g., proper association with a set of pre-compiled files or repositories, such as JARs that are used for dependency resolution). It was further determined that properly configuring the build environment within such an environment to find the correct level/version of all supporting software components and to resolve all dependencies for a code build is a time-consuming task that is prone to error. It was additionally determined that, as the size and complexity of systems increases, maintenance of these different levels/versions of components and dependency resolution for code builds that are in the latter stages of lifecycle management (e.g., projects that go through multiple releases, projects that are being maintained over time, etc.) become increasingly difficult over time. The present subject matter improves dependency resolution in complex environments by providing for programmatic identification and selection of supporting software components with method (function) signatures that match dependencies associated with a code build, as described above and in more detail below. As such, improved dependency resolution may be obtained through use of the present technology.

The compilation dependency resolution from a diverse group of candidate resources described herein may be performed in real time to allow prompt dependency resolution during code building/compilation and/or static code build dependency analysis. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art. Additionally, these terms are understood to vary relative to the underlying capacity and performance capabilities of the underlying computational system (e.g., systems with faster processors and faster disk access speeds may perform work faster that alternative slower implementations).

FIG. 1 is a block diagram of an example of an implementation of a system 100 for compilation dependency resolution from a diverse group of candidate resources. A developer computing device 102 communicates via a network 104 with several other devices. The other devices include a build server_1 106 through a build server_M 108. A code repository 110 provides syntax and component-level storage for code.

The developer computing device 102 may be used by a developer/user to initiate code building/compilation and/or static code build dependency analysis. The code building/compilation and/or static code build dependency analysis may be performed by the developer computing device 102, or the developer computing device 102 may be used as an interface to initiate processing for code building/compilation and/or static code build dependency analysis by one or more of the build server_1 106 through the build server_M 108. The code building/compilation processing may include individual module compilation, component linking and library resolution, component and/or library binding and connection, and other build functionality as appropriate for a given implementation. The static code build dependency analysis may include processing to evaluate build dependency resolution, report generation, or other functionality as appropriate for a given implementation.

As such, any of the developer computing device 102 and the build server_1 106 through the build server_M 108 may provide functionality either independently or in combination as described herein. The build server_1 106 through the build server_M 108 may also provide access to pre-compiled linkable modules, and may include, for example, Websphere® or other servers as appropriate for a given implementation.

As will be described in more detail below in association with FIG. 2 through FIG. 4, the developer computing device_1 102, or the build server_1 106 through the build server_M 108, may each provide automated compilation dependency resolution from a diverse group of candidate resources. The automated compilation dependency resolution from a diverse group of candidate resources is based upon identification of missing dependency references of a software code build, invocation of SEARCHPATH processing to identify additional code modules that are potential candidates to resolve the missing dependency references, and selection of a best-match code module to satisfy the missing dependency references. The SEARCHPATH processing and best-match processing may be implemented in any manner appropriate for a given implementation and the examples described below may be modified as appropriate for the given implementation. As such, a variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, application server, or other data server device, or any other device capable of processing information as described above and in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
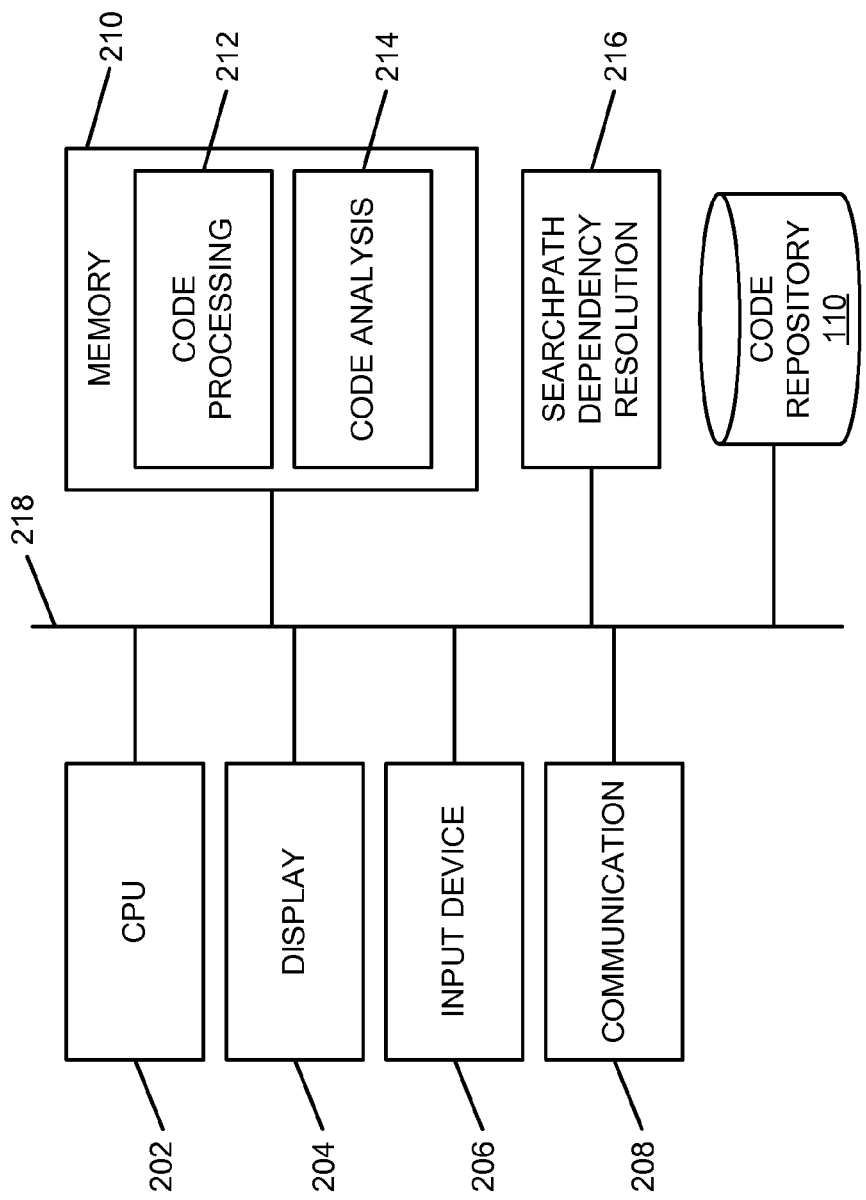
FIG. 2 is a block diagram of an example of an implementation of a core processing module capable of performing compilation dependency resolution from a diverse group of candidate resources according to an embodiment of the present subject matter.

FIG. 2 is a block diagram of an example of an implementation of a core processing module 200 capable of performing compilation dependency resolution from a diverse group of candidate resources. The core processing module 200 may be associated with the developer computing device 102, and may be associated with any of the build server_1 106 through the build server_M 108, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing for compilation dependency resolution from a diverse group of candidate resources in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, or any other type of input device by which the user may interact with and respond to information on the display 204.

It should be noted that the display 204 and the input device 206 may be optional components for the core processing module 200 for certain implementations/devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a code processing area 212 that stores and provides code build processing space for the core processing module 200, such as for code compilation, building, and linking, etc. The memory 210 also includes a code analysis area 214 that provides processing space for code build dependency resolution and analysis, as described above and in more detail below.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A searchpath dependency resolution module 216 is also illustrated. The searchpath dependency resolution module 216 provides compilation and build processing. Additionally, the searchpath dependency resolution module 216 provides code dependency analysis and resolution processing for missing dependency references for the core processing module 200, as described above and in more detail below. As such, the searchpath dependency resolution module 216 implements the compilation dependency resolution from a diverse group of candidate resources of the core processing module 200.

It should also be noted that the searchpath dependency resolution module 216 may form a portion of other circuitry described without departure from the scope of the present subject matter. Further, the searchpath dependency resolution module 216 may alternatively be implemented as an application stored within the memory 210. In such an implementation, the searchpath dependency resolution module 216 may include instructions executed by the CPU 202 for performing the functionality described herein. The CPU 202 may execute these instructions to provide the processing capabilities described above and in more detail below for the core processing module 200. The searchpath dependency resolution module 216 may form a portion of an interrupt service routine (ISR), a portion of an operating system, a portion of a browser application, or a portion of a separate application without departure from the scope of the present subject matter. The code repository 110 is also shown associated with the core processing module 200 within FIG. 2 to show that the code repository 110 may be coupled to the core processing module 200 without requiring external connectivity, such as via the network 104.

The CPU 202, the display 204, the input device 206, the communication module 208, the memory 210, the searchpath dependency resolution module 216, and the code repository 110 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the code repository 110 is illustrated as a separate component for purposes of example, the code modules and information stored within the code repository 110 may also/alternatively be stored within the memory 210 without departure from the scope of the present subject matter. Accordingly, the core processing module 200 may take many forms and may be associated with many platforms.

Figure 3:
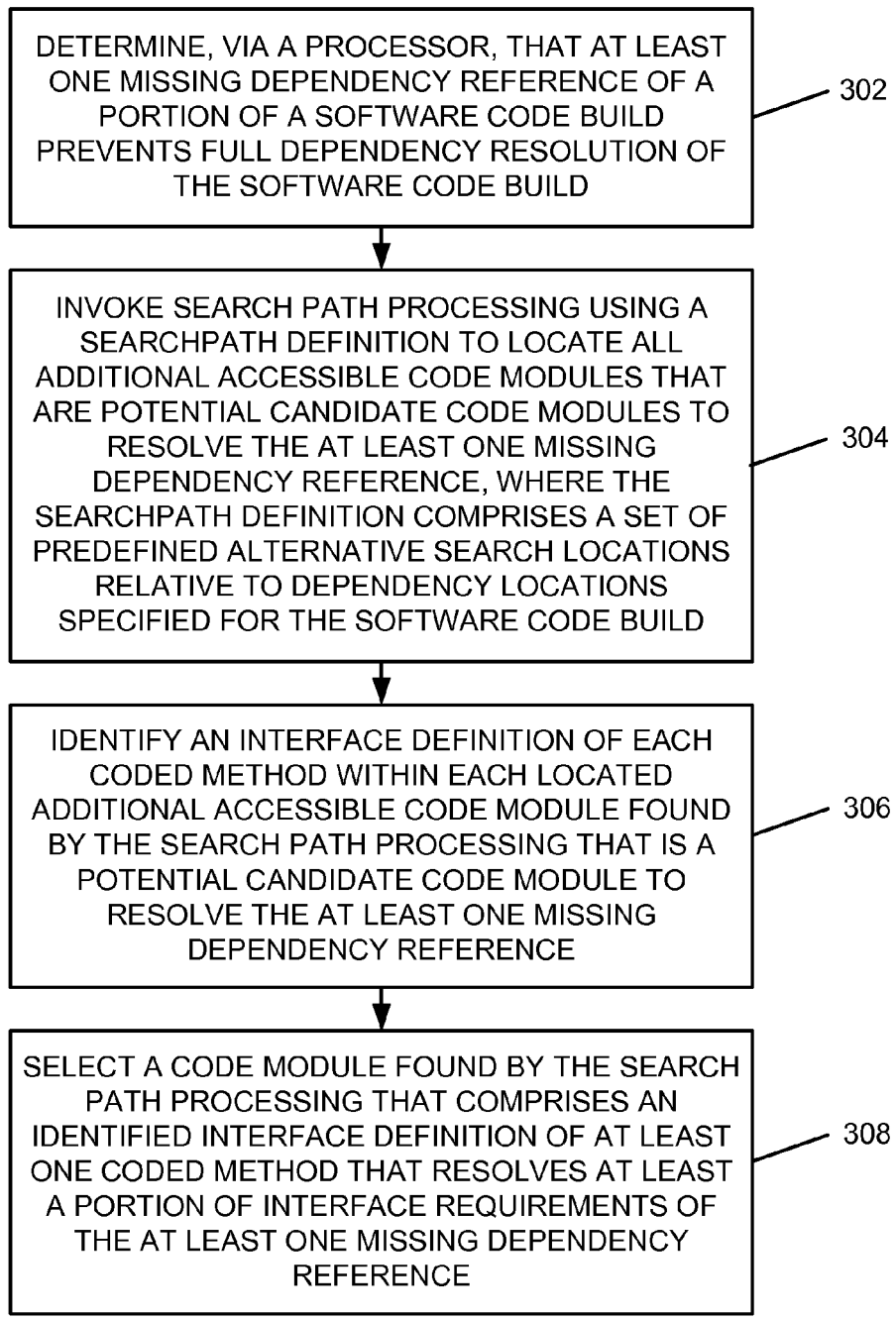
FIG. 3 is a flow chart of an example of an implementation of a process for compilation dependency resolution from a diverse group of candidate resources according to an embodiment of the present subject matter.
Figure 4:
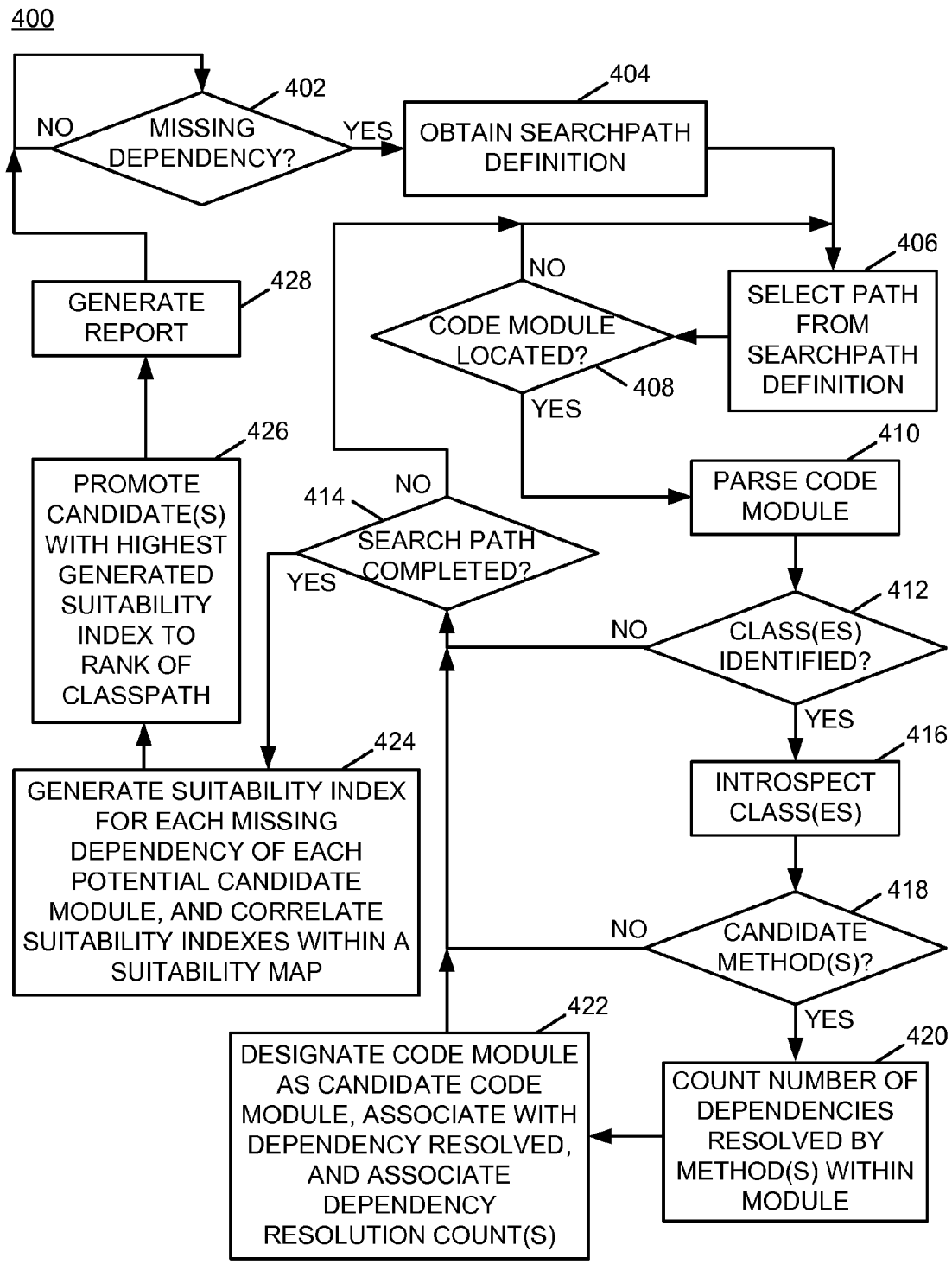
FIG. 4 is a flow chart of an example of an implementation of a process for compilation dependency resolution from a diverse group of candidate resources that implements suitability indexing and dependency resolution feedback according to an embodiment of the present subject matter.

FIG. 3 through FIG. 4 described below represent example processes that may be executed by devices, such as the core processing module 200, to perform the compilation dependency resolution from a diverse group of candidate resources associated with the present subject matter. Many other variations on the example processes are possible and all are considered within the scope of the present subject matter. The example processes may be performed by modules, such as the searchpath dependency resolution module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for compilation dependency resolution from a diverse group of candidate resources. At block 302, the process 300 determines, via a processor, that at least one missing dependency reference of a portion of a software code build prevents full dependency resolution of the software code build. At block 304, the process 300 invokes search path processing using a SEARCHPATH definition to locate all additional accessible code modules that are potential candidate code modules to resolve the at least one missing dependency reference, where the SEARCHPATH definition comprises a set of predefined alternative search locations relative to dependency locations specified for the software code build. At block 306, the process 300 identifies an interface definition of each coded method within each located additional accessible code module found by the search path processing that is a potential candidate code module to resolve the at least one missing dependency reference. At block 308, the process 300 selects a code module found by the search path processing that comprises an identified interface definition of at least one coded method that resolves at least a portion of interface requirements of the at least one missing dependency reference.

FIG. 4 is a flow chart of an example of an implementation of a process 400 for compilation dependency resolution from a diverse group of candidate resources that implements suitability indexing and dependency resolution feedback. The process 400 may be performed, for example, in association with code compilation or static code build dependency analysis, or within combined compilation and dependency analysis processing as appropriate for a given implementation. Though not depicted within FIG. 4, the present subject matter includes creating a SEARCHPATH definition with predefined locations within which to search as appropriate for a given execution platform. Given the many variants of execution platforms, any SEARCHPATH definition appropriate for the respective execution platform may be created, as described above, and used by a process, such as the example process 400 described below. The process 400 may be modified to include processing for developer interaction to create and define a SEARCHPATH definition without departure from the scope of the present subject matter. Further, for purposes of the present example, it is understood that a CLASSPATH definition specifies dependency locations for the software code build and that the process 400 may be invoked in response to a determination that at least one dependency cannot be resolved using (e.g., is missing from) the locations specified in the CLASSPATH definition. Other processing may be added to a process such as the example process 400 as appropriate for a given implementation. Further, for purposes of the example processing described in association with the process 400, it is assumed that at least one missing dependency is identified in association with the search path processing described using a defined SEARCHPATH. Other variations on the process 400 may be implemented as appropriate for a given implementation and all such variations are considered to be within the scope of the present subject matter.

At decision point 402, the process 400 makes a determination as to whether a missing code dependency has been detected. For example, the process 400 may be invoked in response to processing a determination that at least one dependency cannot be resolved using (e.g., is missing from) the locations specified in the CLASSPATH definition for either compilation or static code build dependency analysis.

In response to determining that at least one dependency cannot be resolved using (e.g., is missing from) the locations specified in the CLASSPATH definition, the process 400 obtains a SEARCHPATH definition at block 404. The SEARCHPATH definition includes a set of predefined alternative search locations relative to dependency locations specified for the software code build within the CLASSPATH definition, and specifies a more extensive listing of alternate search locations usable in the event of unresolved dependencies relative to the CLASSPATH definition. For purposes of the present example, it is assumed that multiple dependencies are missing from the CLASSPATH definition and that the process 400 performs a comprehensive search of multiple file location paths specified by the SEARCHPATH definition. The comprehensive search includes searching using each alternative search location specified by the SEARCHPATH definition to locate at least one potential candidate code module unavailable via the CLASSPATH definition. As described above, unlike CLASSPATH processing for compilation or static analysis, the SEARCHPATH processing described herein is exhaustive with respect to each specified path to identify and rank, as described in more detail below, each potential candidate module that may resolve one or more missing dependencies.

As such, at block 406, the process 400 begins/invokes a first iteration of SEARCHPATH processing by selecting a dependency search path specified the SEARCHPATH definition to begin searching for the unresolved/missing dependencies. At decision point 408, the process 400 makes a determination as to whether a code module has been located at the selected dependency search path. The code module may include, for example, a Java™ programming language class file, a JAR file, or other code module as appropriate for a given implementation. For purposes of the present example, to avoid crowding within the drawing it is assumed that one code module may be available per specified and selected dependency search path. However, it is understood that the processing described below for a located code module may be repeated for each code module located via each selected dependency search path, and that such processing is considered to form a portion of the process 400. As such, the process 400 may locate each file accessible via each of multiple file location paths that contains at least one potential candidate code module to resolve one or more missing dependency references.

In response to determining that a code module has not been located at the selected dependency search path at decision point 408, the process 400 returns to block 406 to select another dependency search path specified by the SEARCHPATH and iterates as described above. Returning to the description of decision point 408, in response to determining that a code module has been located at the selected dependency search path, the process 400 parses the code module at block 410. As such, the process 400 may parse each located additional code module found by the search path processing that is a potential candidate to resolve at least one missing dependency reference.

At decision point 412, the process 400 makes a determination as to whether one or more classes have been identified within the parsed code module. In response to determining that one or more classes have not been identified within the parsed code module, the process 400 makes a determination at decision point 414 as to whether search path processing has been completed. In response to determining that search path processing has not been completed, the process 400 returns to block 406 and iterates as described above. Processing responsive to an affirmative determination at decision point 414 will be deferred and described in detail below.

Returning to the description of decision point 412, in response to determining that one or more classes have been identified within the parsed code module, the process 400 performs introspection, using programming language reflection, of the identified class(es) within the parsed code module at block 416. As described above, the code module may include a programming language class file, a programming language archive file (e.g., JAR file), or other code module as appropriate for a given implementation. As also described above, introspection allows identification of method interfaces within the respective code modules.

At decision point 418, the process 400 makes a determination as to whether any candidate methods have been identified by the introspection of the respective class(es) within the code module. The term "method" is used for convenience within the present description and is understood to include "function," or other code module interface nomenclature as appropriate for a given implementation. Introspection may identify one or more method signatures of the identified class(es) within the code module that are candidate methods to resolve the missing dependency references.

In response to determining at decision point 418 that no candidate methods have been identified by the introspection of the respective class(es) within the code module, the process 400 returns to decision point 414 and iterates as described above. In response to determining at decision point 418 that at least one candidate method has been identified by the introspection of the respective class(es) within the code module, the process 400 counts a number of missing dependencies resolved by the method(s) within the code module at block 420. For example, for a class file with a single class, multiple methods within that class may resolve different missing dependencies. Additionally, a class file may include multiple classes and one or more of the classes may resolve different missing dependencies. Further, a JAR file may include several class files and one or more of the class files may resolve different missing dependencies. As such, the resolved dependencies may be counted to document suitability of the code module where multiple code modules resolve different or similar dependencies, as described in more detail below. It should be noted that counting processing is disclosed at this position within the process 400 for ease of illustration purposes, and that other variations of counting processing are possible, such as counting a number of missing dependencies resolved in response to a dependency resolution collision where a number of potential candidate code modules are identified to resolve missing dependencies.

At block 422, the process 400 designates the current code module as a candidate module for dependency resolution, associates the dependency or dependencies resolved by the code module with the code module, and associates the dependency resolution count(s) with the code module. The respective associations may be performed, for example, within a structure created within the code analysis area 214 of the memory 210, or may be performed otherwise as appropriate for a given implementation. The process 400 returns to decision point 414 and iterates as described above until the entire SEARCHPATH set of predefined search locations has been exhausted.

Returning to the description of decision point 414, in response to determining that search path processing has been completed, at block 424 the process 400 generates, for each missing dependency, a suitability index of each potential candidate code module based upon the counted number of dependencies resolved within the potential candidate code module, and correlates the suitability indexes within a suitability map. As such, a potential candidate module with a highest suitability index resolves a highest number of dependencies based upon the counted number of dependencies resolved, and the suitability map forms a correlated set of the suitability indexes.

At block 426, the process 400 promotes the potential candidate code module with the highest generated suitability index for each missing dependency to a rank of CLASSPATH. Promotion of the potential candidate code modules with the highest generated suitability index for each missing dependency to a rank of CLASSPATH may include concatenating a location of each potential candidate code module with the highest generated suitability index to a CLASSPATH definition that specifies the dependency locations for the software code build. As such, the CLASSPATH definition may be programmatically improved by use of the present technology within a complex environment.

It is further understood that multiple code modules may be promoted to the rank of CLASSPATH, but that only one code module is promoted for each missing dependency. Further, where there is a multiple dependency collision of resolutions for missing dependencies across multiple code modules that each have a highest suitability index for a different missing dependency, one code module that resolves the highest number of missing dependencies may be selected for promotion to the rank of CLASSPATH.

As such, at block 428, the process 400 generates a report that includes the selected code module(s), the identified interface definition(s), and each interface requirement of the missing dependency reference(s) resolved by the selected code module. As such, a detailed description of the missing dependencies that have been resolved, the suitability map with the suitability indexes generated for each code module, and the updated CLASSPATH definition with the promoted code module(s) may be reported to document the processing performed by the process 400. It should be noted that that all code modules within the suitability map may be reported to provide developer feedback of existing modules identified by the search path processing, and the developer may use the provided feedback to identify and remove obsolete or otherwise undesirable code modules. The process 400 returns to decision point 402 and iterates as described above in response to additional determinations of missing dependencies.

As such, the process 400 detects missing dependency references for either compilation or static code build dependency analysis. The process 400 performs processing outside of the scope of CLASSPATH processing to exhaustively search for all potential candidate modules to resolve the detected missing dependency references. The process 400 parses located code modules and performs introspection to identify one or more method signatures of the identified class (es) within the code modules that are candidate methods to resolve the missing dependency references. The process 400 ranks, within a suitability map, all potential candidate modules using a suitability index based upon a number of resolved dependency references, and selects a best-match module for one or more missing dependencies in a situation of conflicting potential candidates. The process 400 reports the results of the search path processing to provide developer feedback for code management within a complex environment. As such, the process 400 assists with development, maintenance, and life-cycle management of complex code builds within complex environments.

As described above in association with FIG. 1 through FIG. 4, the example systems and processes provide compilation dependency resolution from a diverse group of candidate resources. Many other variations and additional activities associated with compilation dependency resolution from a diverse group of candidate resources are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    determining, as part of compilation dependency resolution via a processor using CLASSPATH information that specifies dependency locations for a software code build, that a compilation dependency reference of the software code build is missing from the dependency locations specified in the CLASSPATH information and prevents full compilation dependency resolution of the software code build;
    invoking, using a SEARCHPATH definition responsive to determining the missing compilation dependency reference using the CLASSPATH information, programmatic search path processing that iteratively and comprehensively searches and locates all additional accessible code modules comprising a plurality of code modules that are potential candidate compilation code modules to resolve the missing compilation dependency reference, where the SEARCHPATH definition comprises a set of predefined alternative code module search locations that are different from the dependency locations specified for the software code build;
    ranking each search path processing-located additional accessible code module in accordance with a degree of matching between the respective code module and the missing compilation dependency reference by assigning a suitability index to each search path processing-located additional accessible code module based upon similarity of an interface definition of each coded method to the missing compilation dependency reference, with a highest ranking applied to a search path processing-located additional accessible code module with a maximal matching set of parameter and interface mappings relative to the missing compilation dependency reference; and
    selecting the highest ranked search path processing-located additional accessible code module to resolve the missing compilation dependency reference.

2. The method of claim 1, where:
    the SEARCHPATH definition is defined separately from the CLASSPATH information, and the SEARCHPATH definition specifies additional alternative code module search locations usable in an event of unresolved dependencies to resolve the missing compilation dependency reference; and
    determining, as part of the compilation dependency resolution via the processor using the CLASSPATH information that specifies dependency locations for the software code build, that the compilation dependency reference of the software code build is missing from the dependency locations specified in the CLASSPATH information and prevents full compilation dependency resolution of the software code comprises:
        determining the missing compilation dependency reference during static code build dependency analysis of the software code build; and
    invoking, using the SEARCHPATH definition responsive to determining the missing compilation dependency reference using the CLASSPATH information, the programmatic search path processing that iteratively and comprehensively searches and locates all additional accessible code modules comprising the plurality of code modules that are the potential candidate compilation code modules to resolve the missing compilation dependency reference comprises:
        searching using each alternative code module search location specified by the SEARCHPATH definition to locate at least one potential candidate compilation code module unavailable via the CLASSPATH information.

3. The method of claim 1, where invoking, using the SEARCHPATH definition responsive to determining the missing compilation dependency reference using the CLASSPATH information, the programmatic search path processing that iteratively and comprehensively searches and locates all additional accessible code modules comprising the plurality of code modules that are the potential candidate compilation code modules to resolve the missing compilation dependency reference comprises:
    comprehensively searching a plurality of file location paths specified by the SEARCHPATH definition; and
    locating each file accessible via each of the plurality of file location paths that contains at least one potential candidate compilation code module to resolve one or more of the missing compilation dependency reference.

4. The method of claim 1, further comprising identifying the interface definition of each coded method within each located additional accessible code module of the plurality of code modules found by the search path processing that is the potential candidate compilation code module to resolve the missing compilation dependency reference comprising:

parsing each located additional accessible code module found by the search path processing that is the potential candidate compilation code module to resolve the missing compilation dependency reference;

identifying at least one class within at least one of a parsed programming language class file and a parsed programming language archive file;

performing introspection, using programming language reflection, of the identified at least one class within at least one of the parsed programming language class file and the parsed programming language archive file; and identifying at least one method signature of the identified at least one class within the at least one of the parsed programming language class file and the parsed programming language archive file that is a candidate method to resolve the missing compilation dependency reference.

5. The method of claim 1, where:

the missing compilation dependency reference comprises one of a plurality of missing compilation dependency references; and ranking each search path processing-located additional accessible code module in accordance with the degree of matching between the respective code module and the missing compilation dependency reference by assigning the suitability index to each search path processing-located additional accessible code module based upon similarity of the interface definition of each coded method to the missing compilation dependency reference, with the highest ranking applied to the search path processing-located additional accessible code module with the maximal matching set of parameter and interface mappings relative to the missing compilation dependency reference comprises:

counting, in response to a compilation dependency resolution collision where a plurality of potential candidate compilation code modules resolve missing compilation dependency references, a number of missing compilation dependency references resolved within each of the plurality of potential candidate compilation code modules;

generating the suitability index of each of the plurality of potential candidate compilation code modules based upon the counted number of missing compilation dependency references resolved, where a potential candidate compilation code module with a highest suitability index resolves a highest number of missing compilation dependency references; and promoting the potential candidate compilation code module with the highest generated suitability index to a rank of CLASSPATH.

6. The method of claim 5, where promoting the potential candidate compilation code module with the highest generated suitability index to the rank of CLASSPATH comprises:

concatenating a location of the potential candidate compilation code module with the highest generated suitability index to the CLASSPATH information that specifies the dependency locations for the software code build.

7. The method of claim 1, further comprising:

identifying the interface definition of each coded method within each search path processing-located additional accessible code module; and generating a report comprising the selected code module, the identified interface definition of the selected code module, and each missing compilation dependency reference resolved by the selected code module.

8. A system, comprising:

at least one memory that stores a software code build; and a processor programmed to:

determine, as part of compilation dependency resolution using CLASSPATH information that specifies dependency locations for the software code build, that a compilation dependency reference of the software code build is missing from the dependency locations specified in the CLASSPATH information and prevents full compilation dependency resolution of the software code build;

invoke, using a SEARCHPATH definition responsive to determining the missing compilation dependency reference using the CLASSPATH information, programmatic search path processing that iteratively and comprehensively searches and locates all additional accessible code modules comprising a plurality of code modules that are potential candidate compilation code modules to resolve the missing compilation dependency reference, where the SEARCHPATH definition comprises a set of predefined alternative code module search locations that are different from the dependency locations specified for the software code build;

rank each search path processing-located additional accessible code module in accordance with a degree of matching between the respective code module and the missing compilation dependency reference by being programmed to assign a suitability index to each search path processing-located additional accessible code module based upon similarity of an interface definition of each coded method to the missing compilation dependency reference, with a highest ranking applied to a search path processing-located additional accessible code module with a maximal matching set of parameter and interface mappings relative to the missing compilation dependency reference; and select the highest ranked search path processing-located additional accessible code module to resolve the missing compilation dependency reference.

9. The system of claim 8, where:

the SEARCHPATH definition is defined separately from the CLASSPATH information, and the SEARCHPATH definition specifies additional alternative code module search locations usable in an event of unresolved dependencies to resolve the missing compilation dependency reference; and in being programmed to determine, as part of the compilation dependency resolution using the CLASSPATH information that specifies dependency locations for the software code build, that the compilation dependency reference of the software code build is missing from the dependency locations specified in the CLASSPATH information and prevents full compilation dependency resolution of the software code, the processor is programmed to:

determine the missing compilation dependency reference during static code build dependency analysis of the software code build; and in being programmed to invoke, using the SEARCHPATH definition responsive to determining the missing compilation dependency reference using the CLASSPATH information, the programmatic search path processing that iteratively and comprehensively searches and locates all additional accessible code modules comprising the plurality of code modules that are the potential candidate compilation code modules to resolve the missing compilation dependency reference, the processor is programmed to:

search using each alternative code module search location specified by the SEARCHPATH definition to locate at least one potential candidate compilation code module unavailable via the CLASSPATH information.

10. The system of claim 8, where, in being programmed to invoke, using the SEARCHPATH definition responsive to determining the missing compilation dependency reference using the CLASSPATH information, the programmatic search path processing that iteratively and comprehensively searches and locates all additional accessible code modules comprising the plurality of code modules that are the potential candidate compilation code modules to resolve the missing compilation dependency reference, the processor is programmed to:

comprehensively search a plurality of file location paths specified by the SEARCHPATH definition; and locate each file accessible via each of the plurality of file location paths that contains at least one potential candidate compilation code module to resolve one or more of the missing compilation dependency reference.

11. The system of claim 8, where the processor is further programmed to identify the interface definition of each coded method within each located additional accessible code module of the plurality of code modules found by the search path processing that is the potential candidate compilation code module to resolve the missing compilation dependency reference, the processor being programmed to:

parse each located additional accessible code module found by the search path processing that is the potential candidate compilation code module to resolve the missing compilation dependency reference;

identify at least one class within at least one of a parsed programming language class file and a parsed programming language archive file;

perform introspection, using programming language reflection, of the identified at least one class within at least one of the parsed programming language class file and the parsed programming language archive file; and identify at least one method signature of the identified at least one class within the at least one of the parsed programming language class file and the parsed programming language archive file that is a candidate method to resolve the missing compilation dependency reference.

12. The system of claim 8, where:

the missing compilation dependency reference comprises one of a plurality of missing compilation dependency references; and in being programmed to rank each search path processing-located additional accessible code module in accordance with the degree of matching between the respective code module and the missing compilation dependency reference by being programmed to assign the suitability index to each search path processing-located additional accessible code module based upon similarity of the interface definition of each coded method to the missing compilation dependency reference, with the highest ranking applied to the search path processing-located additional accessible code module with the maximal matching set of parameter and interface mappings relative to the missing compilation dependency reference, the processor is programmed to:

count, in response to a compilation dependency resolution collision where a plurality of potential candidate compilation code modules resolve missing compilation dependency references, a number of missing compilation dependency references resolved within each of the plurality of potential candidate compilation code modules;

generate the suitability index of each of the plurality of potential candidate compilation code modules based upon the counted number of missing compilation dependency references resolved, where a potential candidate compilation code module with a highest suitability index resolves a highest number of missing compilation dependency references; and promote the potential candidate compilation code module with the highest generated suitability index to a rank of CLASSPATH, comprising:

being programmed to concatenate a location of the potential candidate compilation code module with the highest generated suitability index to the CLASSPATH information that specifies the dependency locations for the software code build.

13. The system of claim 8, where the processor is further programmed to:

identify the interface definition of each coded method within each search path processing-located additional accessible code module; and generate a report comprising the selected code module, the identified interface definition of the selected code module, and each missing compilation dependency reference resolved by the selected code module.

14. A computer program product, comprising:

a computer readable storage memory having computer readable program code embodied therewith, where the computer readable program code when executed on a computer causes the computer to:

determine, as part of compilation dependency resolution using CLASSPATH information that specifies dependency locations for a software code build, that a compilation dependency reference of the software code build is missing from the dependency locations specified in the CLASSPATH information and prevents full compilation dependency resolution of the software code build;

invoke, using a SEARCHPATH definition responsive to determining the missing compilation dependency reference using the CLASSPATH information, programmatic search path processing that iteratively and comprehensively searches and locates all additional accessible code modules comprising a plurality of code modules that are potential candidate compilation code modules to resolve the missing compilation dependency reference, where the SEARCHPATH definition comprises a set of predefined alternative code module search locations that are different from the dependency locations specified for the software code build;

rank each search path processing-located additional accessible code module in accordance with a degree of matching between the respective code module and the missing compilation dependency reference by causing the computer to assign a suitability index to each search path processing-located additional accessible code module based upon similarity of an interface definition of each coded method to the missing compilation dependency reference, with a highest ranking applied to a search path processing-located additional accessible code module with a maximal matching set of parameter and interface mappings relative to the missing compilation dependency reference; and select the highest ranked search path processing-located additional accessible code module to resolve the missing compilation dependency reference.

15. The computer program product of claim 14, where:

the SEARCHPATH definition is defined separately from the CLASSPATH information, and the SEARCHPATH definition specifies additional alternative code module search locations usable in an event of unresolved dependencies to resolve the missing compilation dependency reference; and in causing the computer to determine, as part of the compilation dependency resolution using the CLASSPATH information that specifies dependency locations for the software code build, that the compilation dependency reference of the software code build is missing from the dependency locations specified in the CLASSPATH information and prevents full compilation dependency resolution of the software code, the computer readable program code when executed on the computer causes the computer to:

determine the missing compilation dependency reference during static code build dependency analysis of the software code build; and in causing the computer to invoke, using the SEARCHPATH definition responsive to determining the missing compilation dependency reference using the CLASSPATH information, the programmatic search path processing that iteratively and comprehensively searches and locates all additional accessible code modules comprising the plurality of code modules that are potential candidate compilation code modules to resolve the missing compilation dependency reference, the computer readable program code when executed on the computer causes the computer to:

search using each alternative code module search location specified by the SEARCHPATH definition to locate at least one potential candidate compilation code module unavailable via the CLASSPATH information.

16. The computer program product of claim 14, where, in causing the computer to invoke, using the SEARCHPATH definition responsive to determining the missing compilation dependency reference using the CLASSPATH information, the programmatic search path processing that iteratively and comprehensively searches and locates all additional accessible code modules comprising the plurality of code modules that are the potential candidate compilation code modules to resolve the missing compilation dependency reference, the computer readable program code when executed on the computer causes the computer to:

comprehensively search a plurality of file location paths specified by the SEARCHPATH definition; and locate each file accessible via each of the plurality of file location paths that contains at least one potential candidate compilation code module to resolve one or more of the missing compilation dependency reference.

17. The computer program product of claim 14, where the computer readable program code when executed on the computer further causes the computer to identify the interface definition of each coded method within each located additional accessible code module of the plurality of code modules found by the search path processing that is the potential candidate compilation code module to resolve the missing compilation dependency reference, comprising causing the computer to:

parse each located additional accessible code module found by the search path processing that is the potential candidate compilation code module to resolve the at least one missing compilation dependency reference;

identify at least one class within at least one of a parsed programming language class file and a parsed programming language archive file;

perform introspection, using programming language reflection, of the identified at least one class within at least one of the parsed programming language class file and the parsed programming language archive file; and identify at least one method signature of the identified at least one class within the at least one of the parsed programming language class file and the parsed programming language archive file that is a candidate method to resolve the missing compilation dependency reference.

18. The computer program product of claim 14, where:

the missing compilation dependency reference comprises one of a plurality of missing compilation dependency references; and in causing the computer to rank each search path processing-located additional accessible code module in accordance with the degree of matching between the respective code module and the missing compilation dependency reference by causing the computer to assign the suitability index to each search path processing-located additional accessible code module based upon similarity of the interface definition of each coded method to the missing compilation dependency reference, with the highest ranking applied to the search path processing-located additional accessible code module with the maximal matching set of parameter and interface mappings relative to the missing compilation dependency reference, the computer readable program code when executed on the computer causes the computer to:

count, in response to a compilation dependency resolution collision where a plurality of potential candidate compilation code modules resolve missing compilation dependency references, a number of missing compilation dependency references resolved within each of the plurality of potential candidate compilation code modules;

generate the suitability index of each of the plurality of potential candidate compilation code modules based upon the counted number of missing compilation dependency references resolved, where a potential candidate compilation code module with a highest suitability index resolves a highest number of missing compilation dependency references; and promote the potential candidate compilation code module with the highest generated suitability index to a rank of CLASSPATH.

19. The computer program product of claim 18, where, in causing the computer to promote the potential candidate compilation code module with the highest generated suitability index to the rank of CLASSPATH, the computer readable program code when executed on the computer causes the computer to:

concatenate a location of the potential candidate compilation code module with the highest generated suitability index to the CLASSPATH information that specifies the dependency locations for the software code build.

20. The computer program product of claim 14, where the computer readable program code when executed on the computer further causes the computer to:

identify the interface definition of each coded method within each search path processing-located additional accessible code module; and generate a report comprising the selected code module, the identified interface definition of the selected code module, and each missing compilation dependency reference resolved by the selected code module.

\* \* \* \* \*